United States Patent

[11] 3,548,878

| [72] | Inventor | Bruno T. Brigandi<br>2570 Benson Ave., Brooklyn, N.Y. 11214 |
|---|---|---|
| [21] | Appl. No. | 811,818 |
| [22] | Filed | Apr. 1, 1969 |
| [45] | Patented | Dec. 22, 1970 |

[54] VALVE ASSEMBLY WITH EXPANSION PLUG
10 Claims, 5 Drawing Figs.

[52] U.S. Cl. .................................................. 137/636.1,
251/158, 251/191, 251/331, 251/335.2
[51] Int. Cl. ...................................................... F16k 11/14
[50] Field of Search............................................ 251/187,
189, 190, 158, 331, 335, 335.1, 335.2, 330, 61.1,
(Gerard Weakley), 320; 137/636.1, 636.4, 637.4

[56] References Cited
UNITED STATES PATENTS

| 2,021,731 | 11/1935 | Leins............................ | 251/331X |
| 2,567,032 | 9/1951 | Schmidt........................ | 251/160X |
| 2,934,314 | 4/1960 | Chambers..................... | 251/331 |
| 3,442,486 | 5/1969 | Serio............................. | 251/331X |
| 3,468,344 | 9/1969 | Sanford......................... | 137/634.4 |

*Primary Examiner*—Clarence R. Gordon
*Attorney*—Allison C. Collard

ABSTRACT: An improved valve construction which utilizes a bellows type expansion plug disposed within its inlet for sealing off the outlet of the valve. The accordion like pleats of the plug form a seal against the internal walls of the valve inlet when the plug is compressed. The plug also includes a flange along its top which when compressed into the valve housing provides both a seal against fluids escaping through the valve stem and a retaining surface for holding the expansion plug securely within the valve housing. The valve also includes a plunger which is disposed within the hollow chamber of the expansion plug and is capable of expanding the bellows away from the inner walls of the inlet to permit fluid to exit from the outlet of the valve.

INVENTOR.
BRUNO T. BRIGANDI

INVENTOR.
BRUNO T. BRIGANDI

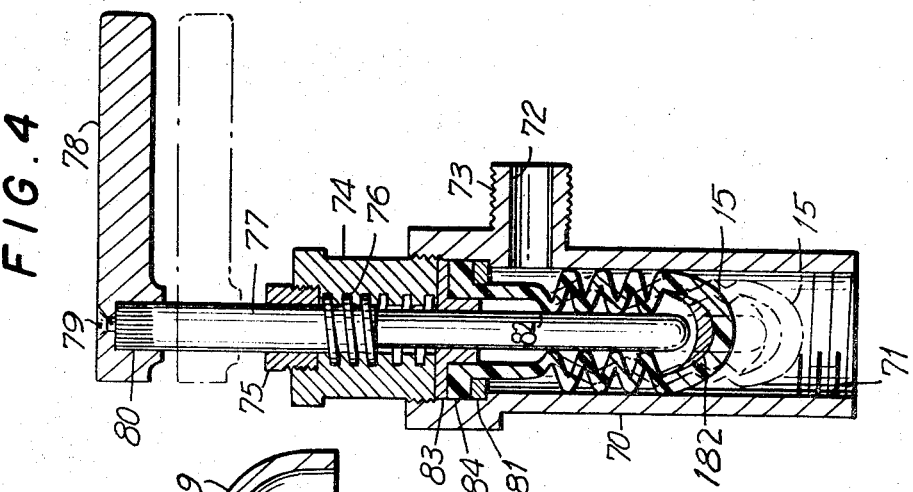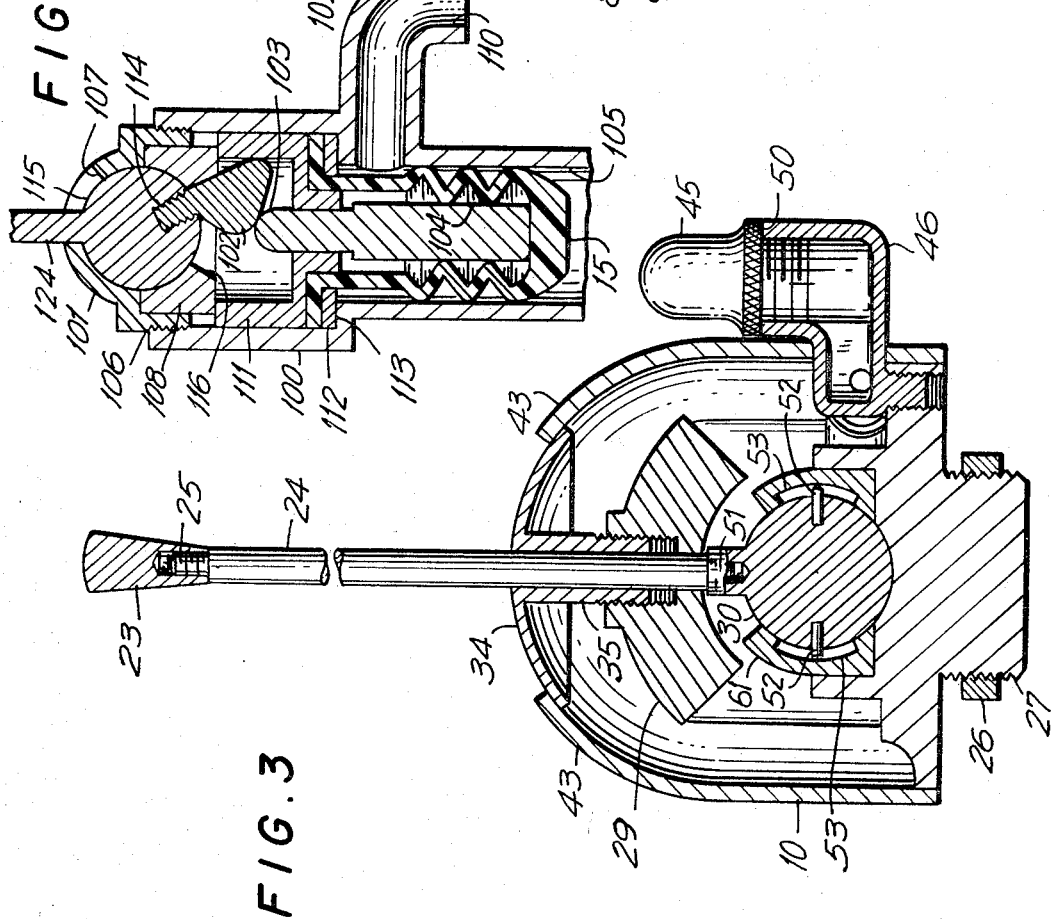

VALVE ASSEMBLY WITH EXPANSION PLUG

This invention relates to a new and improved leakproof valve and expansion plug combination capable of controlling the flow of a fluid therethrough.

More specifically, the present invention relates to a leakproof valve which utilizes an improved expansion plug member for sealing off the inlet of the valve from its outlet when the valve is turned off. The valve according to the present invention utilizes a bellows type plug of hollow construction which is disposed across the inlet of the valve, and when compressed, seals off the inlet so that fluid applied to the inlet will not be communicated to the valve outlet. A plunger is located within the hollow cylinder valve and is connected to the valve stem so that when the plunger is urged against the bottom of the bellows type plug, it will force the plug to expand into the valve inlet so that its accordion-pleated bellows will move away from the walls of the valve inlet and permit fluid to communicate to the valve outlet.

In one embodiment of the invention, the bellows type expansion plug is utilized in a single faucet control wherein the plunger is connected to the stem of the valve for translation along the valve axis. The valve stem is threadably engaged to the body of the valve so that when the stem is rotated, it translates the plunger against the bottom of the bellows plug to expand and contract the plug as required. On the inside of the bottom of the expansion plug is located a bearing surface which permits the end of the plunger to swivel on that surface without causing excessive wear to the bottom of the expansion plug. The pressure of the water disposed within the inlet of the valve also creates a force against the bottom of the expansion plug tending to compress the bellows of the plug across the walls of the inlet when the plunger is withdrawn from against the expansion plug bottom. The base or top portion of the expansion plug terminates in a flange surface which permits it to be conveniently mounted against a correspondingly flanged surface within the valve so that it can be compressed against that valve flange surface to produce a fluid tight seal. No additional washers are thus required, and no leakage along the valve stem can take place.

In another embodiment of the present invention, the expansion plug is utilized in a hot and cold water mixing valve wherein the valve plungers are urged against camming surfaces which control both the flow and temperature of the water in the outlet of the valve. In this embodiment, no bushing surfaces are required at the bottom of the bellows type expansion plug, since the plungers are not rotated within the plug, but are translated along the valve axis by means of the camming surfaces of the mixing valve. In still a further embodiment of the invention, the bellows type expansion plug is utilized in a single valve outlet having a camming surface which is connected to a pivotable valve stem which urges the plunger to expand the bellows of the plug to open the inlet of the valve so that fluids can flow into its outlet. In this embodiment the plunger translates along the valve axis without rotation so that no bushing surface will be required at the point of contact of the plunger against the bottom of the expansion plug.

It is therefore an object according to the present invention to provide an improved valve with a bellows type expansion plug.

It is a further object according to the present invention to provide a leakproof valve which utilizes a bellows type expansion plug for sealing off fluids at the input of the valve from reaching the outlet.

It is still a further object according to the present invention to provide an improved valve and expansion plug which are simple in design, easy to construct, and inexpensive in cost.

Other objects and features of the present invention will become apparent from the following detailed description considered in connection with the accompanying drawings. It is to be understood however that the drawings are designed for the purpose of illustration only and not as a definition of the limits of the invention as to which reference should be made to the appended claims.

In the claims wherein similar reference characters denote similar elements throughout the several views:

FIG. 3 is a cross-sectional view taken along section 3-3 of FIG. 2;

FIG. 4 is a cross-sectional view of another embodiment of the invention utilized in a single valve; and, FIG. 5 is a cross-sectional view of a further embodiment of the invention with a camming surface in a single valve construction for actuating the bellows type plug.

Figure 1:
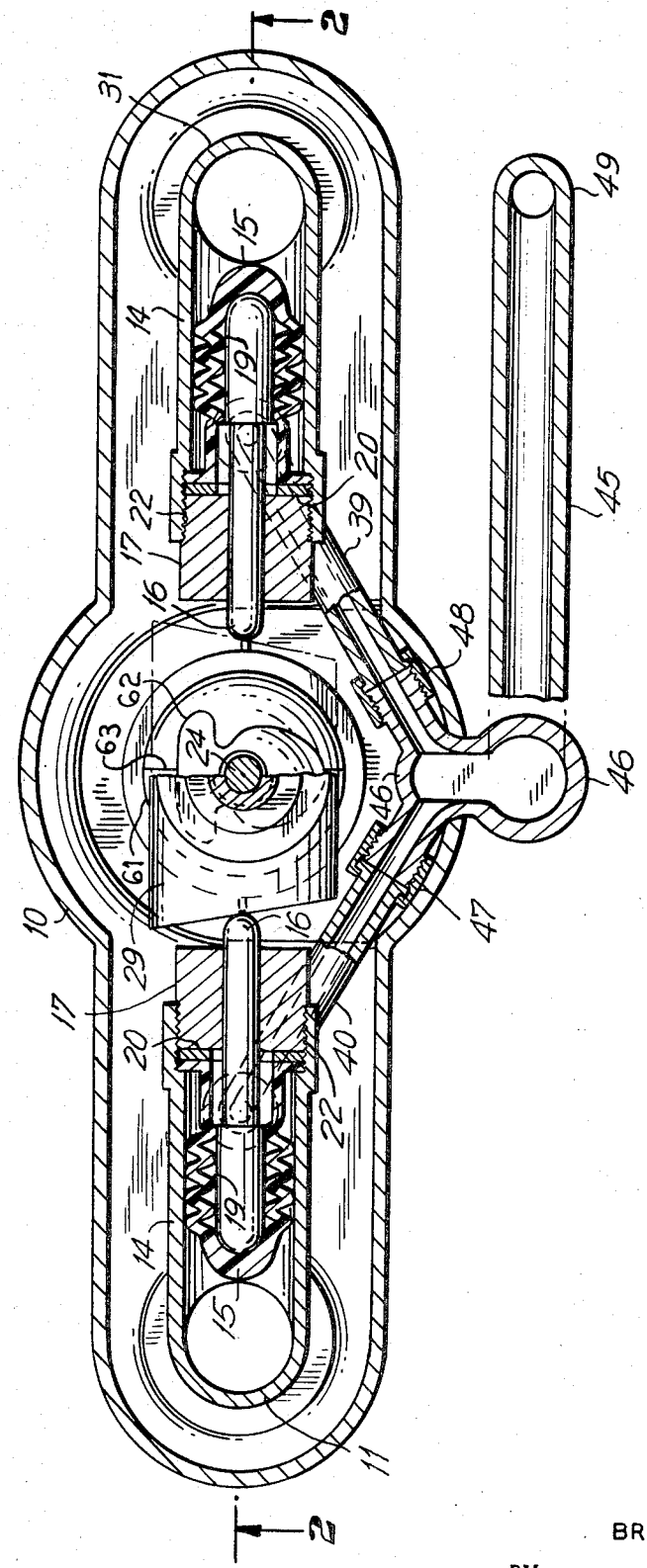
FIG. 1 is a top plan view partly in cross section of one embodiment of the invention.
Figure 2:
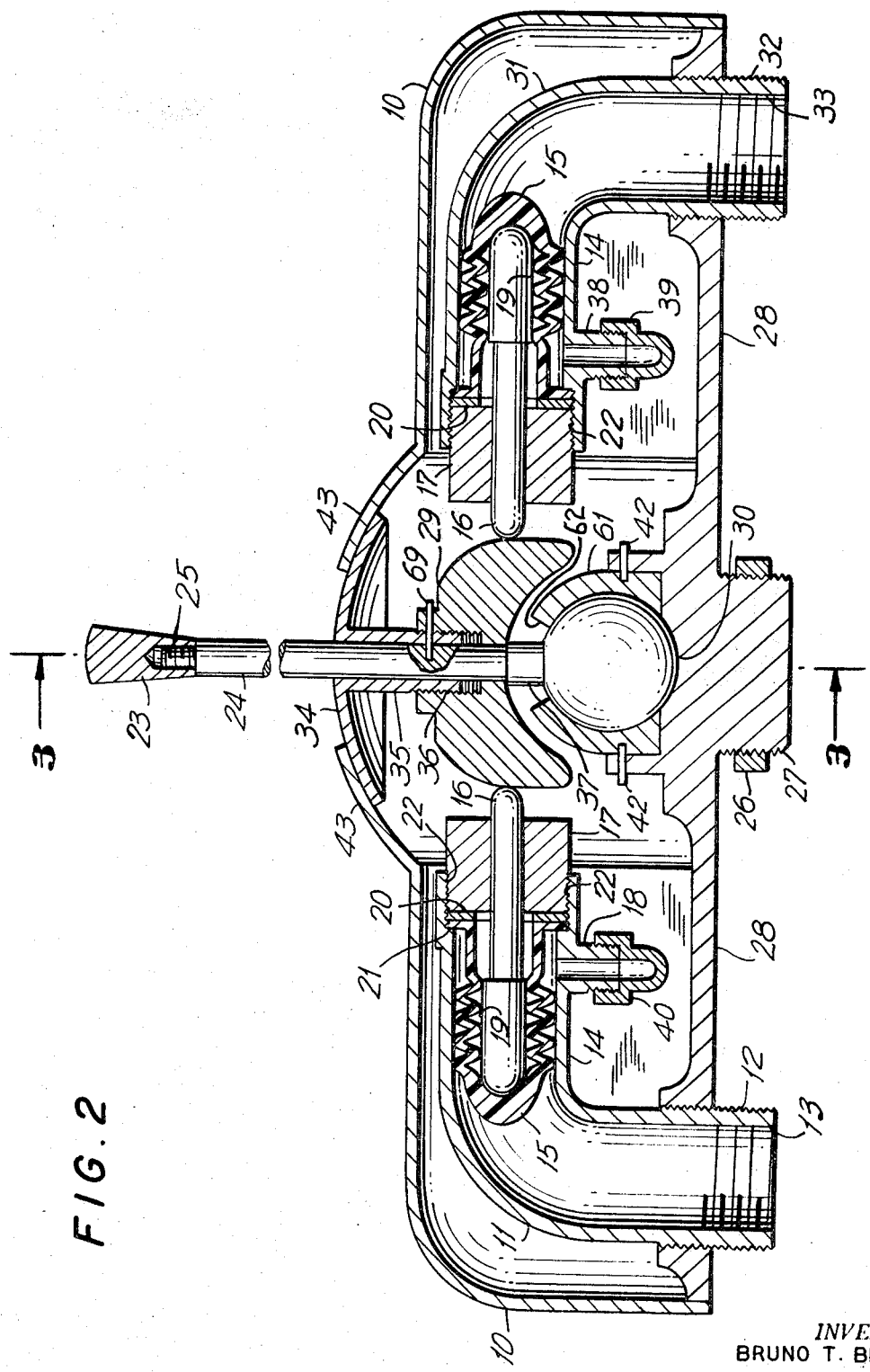
FIG. 2 is a cross-sectional view taken along section 2-2 of FIG. 1.

Referring to FIGS. 1, 2 and 3, there is shown a bellows-type expansion plug according to the invention utilized in a hot and cold water mixing type valve. The valve includes a removable cover 10 disposed over a base portion 28, which includes a threaded mounting bolt 27 at its center and a mounting nut 26 threadably engaged to stud 27. On one side of the valve is a right angle fluid pipe 11 which is threadably coupled to base member 28 so that a portion of helical thread 12 extends below base member 28 to provide a hot water inlet 13. Inlet 13 may be coupled to a conventional hot water supply contained in the building or house into which this valve is mounted. The horizontal portion 14 of pipe 11 constitutes a valve housing which includes an enlarged opening containing threads 22 and a flange surface 21. A bellows-type expansion plug 15 is shown disposed within housing 14 for contact against its internal wall surfaces. Bellows plug 15 terminates in a flange surface for mounting against flange 21. A cylindrical bushing 17 is threadably inserted into the open end of valve housing 14 and urges a washer 20 against the flanged surface of plug 15 to compress the plug against flanged surface 21 of valve housing 14 to form a seal between plug 15 and housing 14, and to retain plug 15 within the inlet of the valve. The valve also includes a stem 16 which translates slidably within a hole below the axis of bushing 17. Integrally formed on the end of stem 16 is a plunger 19 having a diameter slightly larger than the diameter of stem 16 to prevent its removal from the valve through bushing 17. Plunger 19 is disposed within the hollow chamber along the axis of bellows-type plug 15 so that its rounded end portion contacts the end of the bellows. Bellows 15 is shown in its closed position contacting the internal walls of valve housing 14 to prevent hot water, entering inlet 13, from reaching an outlet opening 18 disposed along the side of the valve adjacent to flange 21. There is sufficient room within pipe 11 to permit plug 15 to expand and stretch the accordion-pleated bellows in response to the movement of plunger 19.

On the opposite side of the mixing valve device is a cold water valve formed within the end of elbow pipe 31 which includes a cold water inlet 33. A conventional cold water pipe can be threadably coupled to threads 32 of inlet 33 in order to provide a supply of cold water under pressure to valve outlet 38. The remaining portions of the cold water valve are identical to that of hot water valve and operate in a similar manner.

Above bolt 27, of body frame member 28, is swivelably positioned a spherical ball 30 which is nested in a ball joint between spherical ball retaining members 61. Retaining members are pinned to body frame 28 by means of pins 42. A control handle 24 consisting of a long cylindrical rod is threadably coupled to ball 30 at joint 37 by means of helical thread 51. The opposite end of rod 24 includes a handle 23 which is threadably engaged to the rod by means of threads 25. A cam 29 is secured through hollow shaft 35 to control shaft 24 by means of pin 69. Shaft 35 is threadably engaged by means of threads 36 into cam 29. The other end of shaft 35 terminates in a dome-shaped surface 34 which slides across the internal walls of open topped dome 43 to cover member 10.

Both the hot and cold water valve stems are urged against the surfaces of cam 29. The vertical cross section of cam 29 is shown in FIG. 2 as having sloping shoulders, while the horizontal cross section as shown in detail in FIG. 1, is trapezoidal in shape. Outlet 18 of the hot water valve is connected through pipe 40 to a triangular pipe coupling 46. The end of pipe 40 is sealed against triangular fitting 46 by means of coupling 47. Likewise, outlet 38 of the cold water valve is coupled through pipe 39 into triangular fitting 46 by means of coupling 48. Triangular fitting 46 is connected to a faucet arm 45 through its swivel flange 50 so that cold and hot water passing through tubes 39 and 40 will pass through triangular fitting 46 and faucet 45 into outlet 49.

When the end of control handle 23 is swiveled toward triangular fitting 46, and trapezoidal sides of cam 29 will urge against the rounded ends of valve stem 16 to force the stems and plungers against the bottom of bellows plug 15 to expand the plug to increasingly permit cold and hot water to reach valve outlets 38 and 18. Ball retainers 61 are split into two sections along line 63 for insertion of round ball 30 within housing 28. Ball retainers 61 include a pear shaped cutout opening 62 which defines the limits of movement of handle 24 engaged in ball 30. Ball 30 is also provided with a pair of keys 52 as shown in detail in FIG. 3 which translate through a confined path in keyways 53 on ball retainers 61.

When control rod 24 is swiveled sideways in flow control cutout opening 62 toward either the hot or cold water valve, from its shutout position going to full hot, or full cold, and from an increasing equal hot or cold mixture position, the shoulderlike surfaces of cam 29 as shown in detail in FIG. 2 will cause one of the plungers 16 to further expand one valve bellows 15, while the other plunger will translate inward toward the camming surface and contract to keep the flow constant. It is therefore possible with this mixing valve device to control both the temperature and flow of the water with a single valve control rod.

FIG. 4 illustrates the application of the bellows type expansion plug utilizing a single valve. Expansion plug 15 is shown in solid line in its compressed state disposed within the internal walls of inlet 71. The flange portion 84 of plug 15 is retained between flange washer 81 and washer bushing 83 in the top opening valve housing 70. A valve bushing 74 is threadably inserted into the opening of housing 70 and tightened to compress bellows flange 83 between washers 81 and 83. The compressed flange 84 provides a fluid seal for housing 70 and retains plug 15 within the inlet of the valve. The valve also includes an outlet opening 72 integrally formed along the sides of valve housing 70. Outlet 72 also contains helical threads 73 on its outer circumference for engagement to a flow outlet fixture. Bushing 74 includes an internal helical thread disposed along its axis for cooperation with the external helical thread 76 of valve stem 77. A retaining bushing 75 is threadably inserted on the top of bushing 74, and surrounds stem 77 to prevent valve stem 77 from being removed from housing 70. The top end of valve stem 77 includes a spline 80 into which is inserted a handle 78. The handle is bolted by means of screw 79 to the top of stem 77. The opposite end of stem 77 includes a plunger 82 which extends into the hollow internal chamber of expansion plug 15. The end of plunger 82 is rounded for contact with a bearing surface 182 which is secured at the end of plug 15. By rotating valve handle 78, stem 77 and plunger 82 will advance into the inlet of the valve, as shown in dotted line, to expand bellows plug 15 away from the internal walls of inlet 71 and permit fluid under pressure at the inlet to flow out of outlet 72.

The bellows-type expansion plug 15 may be formed out of a resilient flexible material such as rubber or neoprene so that in its relaxed position, the accordion-pleated bellows are in a compressed state. By employing this expansion plug in the valves of FIGS. 1—4, it can be seen that the accordion-pleated pleats of the bellows provide a plurality of resilient sealing points along the internal walls of the valve housing when the bellows is compressed so as to prevent fluids from reaching the valve outlets. Furthermore, the pressure of the fluid in the valve inlet serves to further compress the expansion plug so as to increase its ability to seal off the valve outlet.

Referring to FIG. 5, there is shown a cross-sectional view of still a further embodiment of the invention wherein the bellows type expansion plug is utilized in a single valve construction which does not include a rotatable valve stem. Expansion plug 15 is shown disposed within the inlet 105 of valve housing 100. Its flange portion is compressed between washer 112 and central member 111, against flange 113 of valve housing 100. Along the axis of central member 111 is slidably disposed a stem 103 having a rounded end surface. Within the hollow chamber of expansion plug 15 is contained a plunger 104 which is integrally formed as a part of stem 103. The top end of housing 100 threadably engages a bushing 101. Within bushing 101 is pivotably disposed a ball 115. A slot 107 within the top of bushing 101 permits a handle 124 to be connected to ball 115 so that the ball may be swiveled within housing 100. Nesting against a portion of the bottom of the ball 115 is a ball retaining surface 108 which is supported on the top rim of central member 111 and retained within valve housing 100 by means of bushing 101. Threadably engaged into ball 115 by means of threads 114 is a cam 102 which has an external edge surface for sliding contact with the rounded top portion of stem 103. A slot 116 is provided at the bottom of retainer 108 to permit cam 102 to traverse a limited distance across the end of stem 103. Along the side of valve housing 100 is included a spout 109 having an outlet 110 which is fluidly communicative to inlet 105. When control arm 124 is pivoted forward, toward outlet 110, cam surface 103 urges against the rounded top surface of stem 103 so as to advance plunger 104 into plug 15 and thus expand the plug so that its bellows becomes disengaged from the internal walls of inlet 115 to permit fluid to flow out of outlet 110. It is obvious from the construction of this valve, when compared with the construction of valve of FIG. 4, that plunger 104 does not rotate within plug 15 so that no bearing surface is required to protect the end of the plug from the plunger.

The valves of FIGS. 1—5 and their associated hardware may be constructed from a metal such as brass, and chromium plated for appearance.

While only a few embodiments of the present invention have been shown and described, it will be understood that many changes and modifications may be made thereunto without departing from the spirit and scope of the invention.

I claim:
1. A valve assembly having at least one inlet and an outlet comprising:
   valve housing means having a cylindrically-shaped hollow chamber in communication with the inlet of said valve;
   at least one outlet disposed along the side of said valve housing means communicative with said hollow chamber;
   a bellows-type expansion plug disposed across the inlet of valve housing means for compression against the internal walls of said inlet;
   plunger means disposed within said expansion plug and in contact with the bottom thereof; and
   means for urging said plunger means along the axis of said valve housing means to expand said bellows-type plug so as to permit fluid at the valve inlet to exit through the outlet.

2. The valve assembly as recited in claim 1 wherein said means for urging comprises:
   stem means secured to said plunger means;
   cam means in contact with said stem means; and
   means for moving said cam means against said stem means for opening and closing said valve assembly.

3. The valve assembly as recited in claim 2 wherein said cam moving means comprises:
   a ball joint secured to said valve housing means and having a cutout opening;
   a ball pivotably nested within said ball joint; and
   a handle secured to said ball through said cutout opening for moving said ball within said cutout of said ball joint, said handle being coupled to said cam means for imparting movement to said stem means to open and close said valve assembly.

4. The valve assembly as recited in claim 3 wherein said housing means comprises two valve housings having their outlets connected together and said stem means comprises two valve stems disposed along the axis of each housing wherein both of said valve stems are urged against said cam means from opposite directions.

5. The valve assembly as recited in claim 4 wherein said cam means comprises a trapezoidal shaped cam having sloping camming surfaces in contact with said valve stem means, with movement limits controlled by said cutout in said ball joint, so that form a shutoff position going to one full individual flow, and from increasing equal mixture when moved sideways increasing one flow and decreasing the other flow keeps constant flow with a different mixture.

6. The valve assembly as recited in claim 5 wherein said ball and ball joint additionally comprise:
   a pair of keyways disposed in said ball joint on opposite sides; and
   a pair of oppositely directed key pins secured on the surface of said ball and directed into said keyways so as to keep constant the movement of said camming surfaces in contact with said stem means.

7. The valve assembly as recited in claim 1 additionally comprising a valve stem threadably engaged to said valve housing means so that rotation of said stem translates said plunger means to expand and contract said expansion plug.

8. The valve assembly as recited in claim 7 wherein said expansion plug additionally comprises a bearing surface secured to the end of said plug for pivotably contact with the end of said plunger means.

9. The valve assembly as recited in claim 2 wherein said cam moving means comprises:
   a ball joint secured to said valve housing means;
   a ball pivotably nested within said ball joint having a cutout opening; and
   a handle secured to said ball for moving said ball in said cutout of said ball joint, said cam means through being a second cutout to the surface of said ball for sliding contact with said stem means.

10. The valve assembly as recited in claim 1 wherein said expansion plug includes a flange, and the hollow chamber of said housing means includes a corresponding flange for compressably receiving and sealing said plug flange to said valve housing means.